United States Patent
Carroll

(10) Patent No.: US 10,200,773 B2
(45) Date of Patent: Feb. 5, 2019

(54) FINGER-WEARABLE MOBILE COMMUNICATION DEVICE

(71) Applicant: David W. Carroll, Grantsburg, WI (US)

(72) Inventor: David W. Carroll, Grantsburg, WI (US)

( * ) Notice: Subject to any disclaimer, the term of this patent is extended or adjusted under 35 U.S.C. 154(b) by 0 days.

(21) Appl. No.: 15/979,684

(22) Filed: May 15, 2018

(65) Prior Publication Data

US 2018/0262823 A1 Sep. 13, 2018

Related U.S. Application Data

(63) Continuation of application No. 14/747,378, filed on Jun. 23, 2015, now Pat. No. 9,973,837.

(60) Provisional application No. 62/016,382, filed on Jun. 24, 2014.

(51) Int. Cl.
| | |
|---|---|
| *H04R 1/02* | (2006.01) |
| *H04M 1/03* | (2006.01) |
| *H04M 1/02* | (2006.01) |
| *H04B 1/3827* | (2015.01) |

(52) U.S. Cl.
CPC ............. *H04R 1/028* (2013.01); *H04B 1/385* (2013.01); *H04M 1/0266* (2013.01); *H04M 1/0281* (2013.01); *H04M 1/035* (2013.01); *H04B 2001/3861* (2013.01); *H04R 2499/11* (2013.01)

(58) Field of Classification Search
CPC .......... H04R 2499/11; H04R 2201/023; G06F 1/163; G06F 3/014; H04B 2001/3861
See application file for complete search history.

(56) References Cited

U.S. PATENT DOCUMENTS

| | | | | |
|---|---|---|---|---|
| 6,057,966 | A * | 5/2000 | Carroll .............. | G02B 27/0172 345/8 |
| 8,118,435 | B2 | 2/2012 | Carroll | |
| 8,339,248 | B2 | 12/2012 | Carroll | |
| 9,651,992 | B2 * | 5/2017 | Stotler .................... | G06F 1/163 |
| 2001/0011025 | A1* | 8/2001 | Ohki ..................... | H04B 1/086 455/556.1 |
| 2005/0009584 | A1 | 1/2005 | Park et al. | |
| 2006/0203999 | A1 | 9/2006 | Mirzakhanov | |
| 2006/0216603 | A1 | 9/2006 | Choi | |
| 2007/0272070 | A1 | 11/2007 | McGinnis, II | |
| 2010/0188326 | A1 | 7/2010 | Dines | |
| 2010/0231505 | A1 | 9/2010 | Iwata | |
| 2011/0007035 | A1* | 1/2011 | Shai ........................ | G06F 3/014 345/179 |
| 2011/0210931 | A1* | 9/2011 | Shai ........................ | G06F 3/014 345/173 |

(Continued)

*Primary Examiner* — Matthew A Eason

(74) *Attorney, Agent, or Firm* — Dicke, Billig & Czaja, PLLC

(57) ABSTRACT

A mobile communication device configured to be worn on an index finger of a user's hand. The device includes a case, a microphone, a switch, and a power source. The microphone and the switch are strategically located along a shape of the case so that as worn on the user's index finger and when the switch is activated by the thumb of the user's hand, the hand naturally cups about the microphone to form a barrier to ambient noise. Further, the microphone can readily be located near a corner of the user's mouth for optimal speech-receiving conditions and to provide more private audio input.

17 Claims, 4 Drawing Sheets

(56) References Cited

U.S. PATENT DOCUMENTS

| | | | |
|---|---|---|---|
| 2012/0075196 A1* | 3/2012 | Ashbrook | G06F 3/014 |
| | | | 345/173 |
| 2012/0212339 A1 | 8/2012 | Goldblatt | |
| 2012/0218184 A1* | 8/2012 | Wissmar | G06F 3/0346 |
| | | | 345/158 |
| 2012/0321150 A1* | 12/2012 | Ranganathan | G06F 3/0488 |
| | | | 382/124 |
| 2013/0154927 A1 | 6/2013 | Urbach, III | |
| 2013/0322670 A1* | 12/2013 | Hosoi | H04R 25/554 |
| | | | 381/315 |
| 2014/0279528 A1* | 9/2014 | Slaby | H04L 63/0853 |
| | | | 705/44 |
| 2014/0301559 A1 | 10/2014 | Tan | |
| 2015/0208153 A1* | 7/2015 | Hosoi | H04R 25/554 |
| | | | 381/332 |
| 2015/0220109 A1* | 8/2015 | von Badinski | G01P 15/00 |
| | | | 340/539.12 |
| 2015/0277559 A1* | 10/2015 | Vescovi | G06F 3/014 |
| | | | 345/173 |
| 2015/0287412 A1* | 10/2015 | Tang | A44C 9/0053 |
| | | | 704/275 |
| 2015/0373443 A1* | 12/2015 | Carroll | H04B 1/385 |
| | | | 381/364 |
| 2016/0134737 A1* | 5/2016 | Pulletikurty | G06F 3/0227 |
| | | | 715/735 |
| 2018/0262823 A1* | 9/2018 | Carroll | H04B 1/385 |

\* cited by examiner

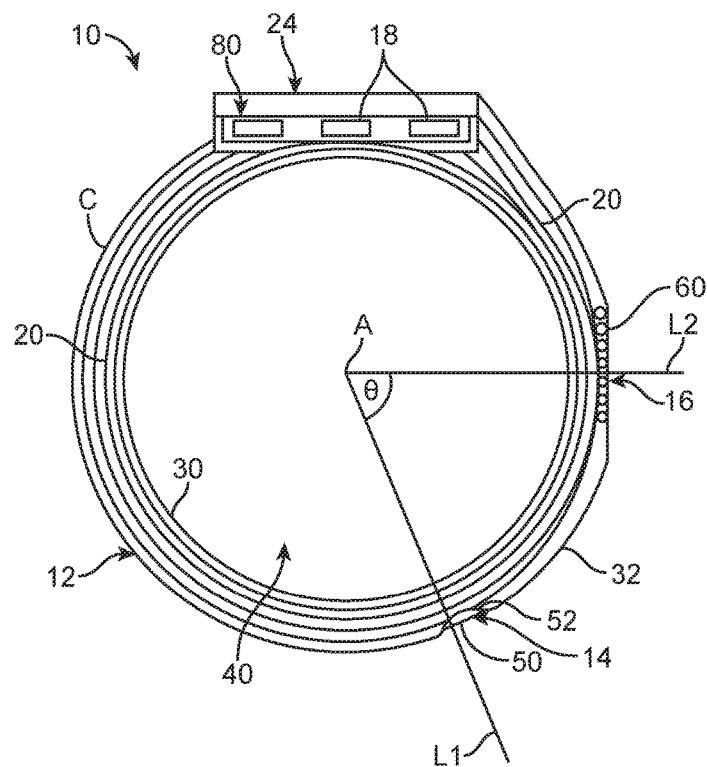
FIG. 1A
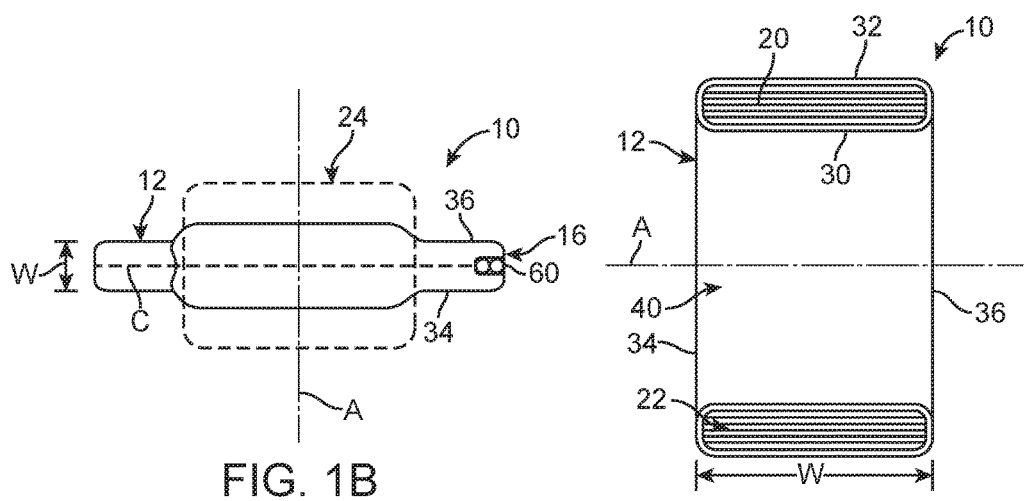
FIG. 1B
FIG. 1C

FINGER-WEARABLE MOBILE COMMUNICATION DEVICE

CROSS REFERENCE TO RELATED APPLICATIONS

This application is a continuation of, and claims the benefit of the filing date of, U.S. application Ser. No. 14/747,378, filed Jun. 23, 2015, now U.S. Pat. No. 9,973,837 which claims the benefit of the filing date of U.S. Provisional Patent Application Ser. No. 62/016,382, filed Jun. 24, 2014, entitled "FINGER-WEARABLE MOBILE COMMUNICATION DEVICE," the teachings of each of which are herein incorporated by reference in their entirety.

BACKGROUND

The present disclosure relates to mobile communication devices. More particularly, it relates to wearable communication devices that promote user handling in a manner minimizing ambient noise.

Mobile personal communication devices are highly prevalent in the modern day world. Mobile or cellular phones and handheld, two-way radio transceivers are two well-recognized examples of a mobile (or wireless) communication device. These and similar device formats can be carried by the user to virtually any location, and allow the user to communicate with others. In most basic terms, a mobile communication device includes a case maintaining at least one microphone for receiving a speech signal from the user. Various electronics are also provided (e.g., an analog/digital converter) to convert the received speech signal into a format suited for wireless transmission, along with a switch or other user-operated actuator that effects some control over device operation. While many mobile communication devices include a number of additional components or features (e.g., speaker(s), touch pad(s), display screen, etc.), the microphone is a core component.

Microphones used with mobile communication devices are typically miniature in size, formatted to be highly sensitive to sound waves or vibrations. While this sensitivity is no doubt desirable for better detecting the user's voice, ambient noise is also readily received. The negative effects of ambient noise are a common concern with mobile communication devices, and can be addressed in various manners. A primary technique is to locate the microphone relative to the case such that when held as intended, the microphone will be proximate, or "aimed" at, the user's mouth. Oftentimes, however, other end-use requirements of the device dictate that the microphone will inherently be at least slightly away from the user's mouth (e.g., with mobile telephones, intended handling during use locates a speaker carried by the device case at the user's ear, with this held orientation of the case locating the microphone at least slightly away from the mouth).

More-recent technological advancements employ one or more secondary microphones along with noise cancellation algorithms or software, filtered HDR microphones, etc., to address ambient noise. While viable, these technologies represent an added cost. And they do not address the underlying reason why ambient noise is able to negatively affect microphone performance; namely, when the device is held as intended, the microphone is "exposed" to the surrounding environment, and thus ambient noise in the surrounding environment readily progresses to, and is sensed, by the microphone. Of course, a user can cup his or her free hand (i.e., the hand not otherwise holding the mobile communication device) "over" the space between the microphone and the user's mouth, with the free hand thus serving as a barrier to ambient noise. However, this now two-handed device operation is at best inconvenient, and in many situations, is entirely unacceptable to the user. Further exacerbating a user's dissatisfaction with a particular mobile communication device is that the device must be stored during periods of non-use; while most mobile communication devices are sufficiently small so as to be stored in a pocket of clothing worn by the user or in other articles (e.g., purse) carried by the user, users often struggle to remember where the device has been stored. Other solutions, such as linking the mobile communication device to a clip or other mechanism that can be secured to the user's person (e.g., a belt clip), are unacceptably obtrusive in appearance and wearability. When immediate access to the device is necessary, the extra time required to locate the device can be quite frustrating.

In light of the above, a need exists for a mobile communication device that can be easily and unobtrusively carried by the user, and that naturally addresses ambient noise when held and operated as intended.

SUMMARY

Some aspects of the present disclosure relate to a mobile communication device configured to be worn on an index finger of a user's hand. The device includes a case, a microphone, a switch, and a power source. The microphone and the switch are strategically located along a shape of the case so that as worn on the user's index finger and when the switch is activated by the thumb of the user's hand, the hand naturally cups about the microphone to form a barrier to ambient noise. Further, the microphone can readily be located near a corner of the user's mouth for optimal speech-receiving conditions.

BRIEF DESCRIPTION OF THE DRAWINGS

FIG. 1A is an enlarged cross-sectional view of a mobile communication device in accordance with principles of the present disclosure;

FIG. 1B is a top plan view of the device of FIG. 1A;

FIG. 1C is a lateral cross-sectional view of the device of FIG. 1A;

DETAILED DESCRIPTION

Figure 2:
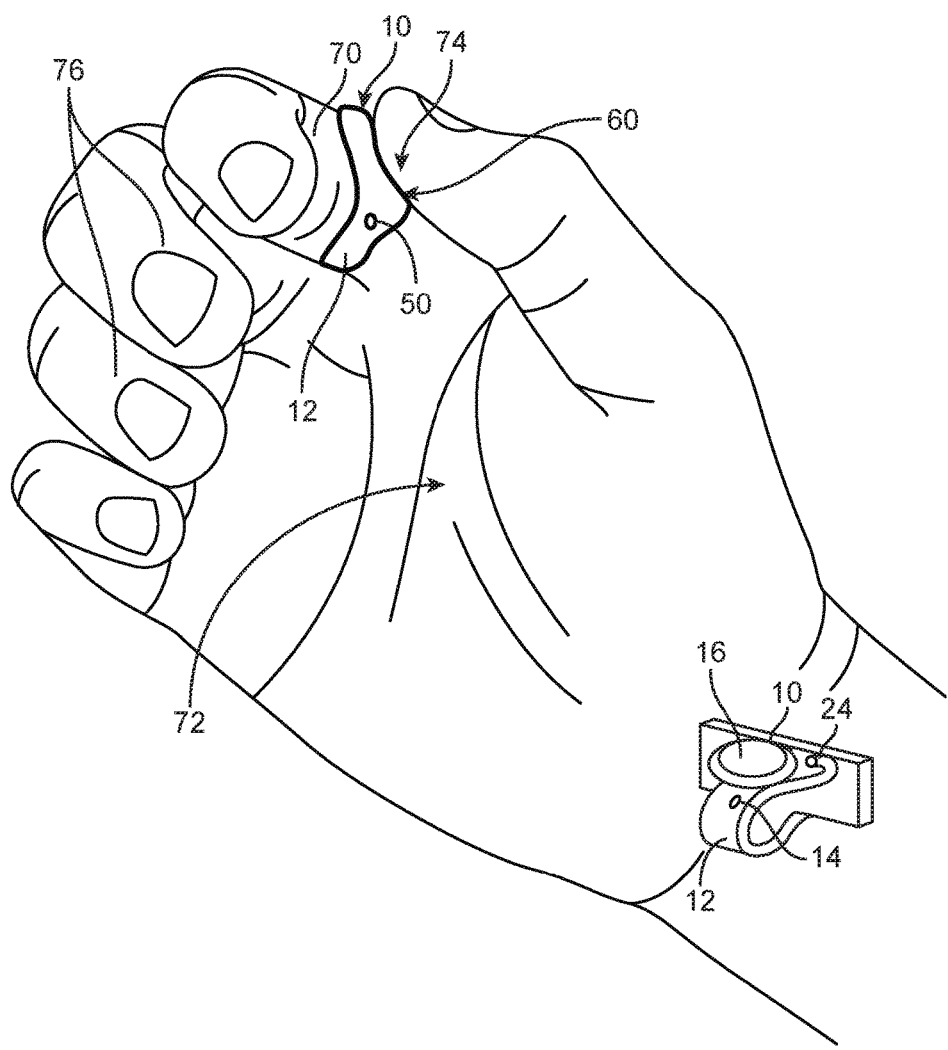
FIG. 2 is a perspective view of the device of FIG. 1A worn on user's hand, along with a second illustration of the device overlaid on the user's arm for further reference.

One embodiment of a mobile communication device 10 in accordance with aspects of the present disclosure is shown in FIGS. 1A-1C. The device 10 includes a case 12 maintaining a microphone 14, a switch 16, electronic components 18 (referenced generally), circuitry 20, and a power source 22. Details on the various components are provided below.

In general terms, however, the case 12 can have a ring-like shape configured to be worn on a user's index finger, or can be configured for mounting to a separate ring body that is conventionally or normally worn on a user's finger. The microphone 14 and the switch 16 are carried by the case 12, and are located relative to one another so as to naturally encourage handling of the device 10 in a manner that reduces ambient noise during use. The electronic components 18 control operation of the device 10, including wirelessly communicating sound collected at the microphone 14 in digital form. The circuitry 20 connects the electronic components 18 with the microphone 14 and the switch 16 (as well as with other optional components). Finally, the power source 22 can be carried within the case 12, and provides requisite power to various ones of the components 14, 16, 18 as needed. With this configuration, a user can wear the mobile communication device 10 on his or her index finger, such that the device 10 is always available, readily accessible, and does not negatively affect the user's normal movements. Operating the device 10 to perform a wireless communication activity, the user simply raises his or her index finger (and thus the device 10) to locate the microphone 14 near the user's mouth and presses the switch 16. This action naturally cups the user's hand about the device 10, with the cupped hand serving to block ambient noise. The mobile communication device 10 can optionally include other components as described below, for example a display screen 24 (drawn in phantom in FIGS. 1A and 1B), a touch pad, LED, sensors, etc. The mobile communication device 10 can be used in conjunction with a plethora of other systems requiring wireless delivery of spoken words by a user, for example as part of a mobile phone system in which the device 10 and a separate headset providing one or more speakers are wirelessly connected to a controller. Alternatively or in addition, the mobile communication device 10 can be used with an automated audio operation support system, such as the systems described in U.S. Pat. No. 8,339,248 to Carroll, the entire teachings of which are incorporated herein by reference.

The case 12 can assume a variety of forms configured for being placed over and worn on an index finger of an adult human hand, and generally has the ring-like shape best reflected in FIG. 1A. In some embodiments, the case 12 forms a complete, uninterrupted ring or loop as shown (e.g., the case 12 can have a toroid shape). In other embodiments, the case 12 is less than a complete ring (e.g., the case 12 can be C-shaped). In yet other embodiments, the case 12 can be configured for, or incorporate features appropriate for, attachment to a standard ring (e.g., tuck under, snap fit, etc.). Regardless, a shape of the case 12 forms or defines opposing inner and outer faces 30, 32 extending between opposing, first and second side faces 34, 36. In general terms, the inner face 30 provides a surface for contacting a user's finger, whereas the outer face 32 provides a surface at which the microphone 14 and the switch 16 are accessible.

As best shown in FIG. 1A, the inner face 30 bounds a perimeter of a passage 40 defined by the case 12. The passage 40 is sized and shaped to receive, and in accordance with the nominal size (e.g., diameter) of, an adult human index finger, and in particular to slide along the index finger and comfortably reside over the proximal phalanx. For example, the passage 40 has a diameter in the range of 0.25-2.0 inches, alternatively in the range of 0.5-1.25 inches. It is recognized that the index finger can vary in size from person-to-person. With this in mind, in some embodiments, several ones of the devices 10 are made available to a user, each having a differently sized passage 40; the user simply selects the device 10 providing the best fit. In other embodiments, the case 12 can have a split-ring configuration, allowing a user to selectively expand a size of the passage when inserting his or her finger into the passage 40. Regardless, the case 12 defines the passage 40 to have a central axis, and the inner face 30 can have or define a uniform radius of curvature relative to the central axis A. Alternatively, the inner face 30 can have a compound curvature, and again, the inner face 30 need not be entirely continuous (e.g., the inner face 30 need not form a complete circle). Regardless, and relative to the side cross-sectional view of FIG. 1A, the inner face 30 can be described as having a circumferential shape revolving around the central axis A.

The outer face 32 generally mimics a shape of the inner face 30, and can be described relative the side cross-sectional view of FIG. 1A has having a circumferential shape revolving around the central axis A. While a shape of the outer face 32 can vary from that of the inner face 30, for example to accommodate one or more of the microphone 14, the switch 16 or other components, in some embodiments a shape of the inner face 32 is substantially concentric with a shape of the outer face 32 at least in a region between the microphone 14 and the switch 16, with a curvature of the outer face 32 between the microphone 14 and the switch 16 having a substantially uniform or constant radius curvature relative to the central axis A. Alternatively, a configuration of the outer face 32 can be viewed relative to the opposing side faces 34, 36. A width W of the case 12 is defined as a distance between the opposing side faces 34, 36 along a line parallel with the central axis A. In some embodiments, the case 12 has a substantially uniform width W along at least a majority of the outer face 32 as it revolves about the central axis A, for example at least in a region between the microphone 14 and the switch 16. Moreover, locations of the microphone 14 and the switch 16 relative to the outer face 32 can be described relative to a circumferential line C defined by the outer face 32 in a plane perpendicular to the central axis A. One theoretical circumferential line C is identified in the view of FIG. 1B; further, it will be understood that the view of FIG. 1A is a cross-section taken in a plane perpendicular to the central axis A and is thus indicative of the circumferential line C. It will be understood that the term "circumferential line" is used in the present disclosure to generally reference a closed, circular-like line defined along the outer face 32 and is not limited to a true circle (e.g., the view of FIG. 1A reflects that the circumferential line C defined along the outer face 32 is not a true circle).

The case 12 can be a single, homogenous body, or can be constructed for two or more segments that are separately formed and subsequently assembled. In yet other embodiments, the case 12 is configured for attachment to a separate ring or ring-like body (e.g., a "standard" ring). Regardless, material(s) of the case are selected to form the inner face 30 to comfortably interface with human skin. For example, metal, plastic, etc.

The microphone 14 can assume a variety of forms known in the art and useful for sensing or receiving human speech or voice-generated sound and converting the sound into an electrical signal (e.g., a dynamic microphone, condenser microphone, piezoelectric microphone, electret microphone, etc.). The microphone 14 can be omnidirectional or unidirectional. Regardless, the microphone 14 defines a sound receiving side 50 and is mounted to the case 12 such that the sound receiving side 50 faces or is open to the outer face 32 of the case 12. In this regard, an opening is 52 is formed in the outer face 32 in a region of the microphone 14 so that sound waves readily progress to the sound receiving side 50. A microphone can be placed on the end of a C-shaped ring so as to be aimed at the user's mouth. This location provides additional protection for the microphone from direct contact and filling of the void to the microphone 14 while still retaining the aiming and location advantages. As described in greater detail below, cupping of the user's hand that will otherwise naturally occur while wearing the device 10 and using the microphone helps to capture audio at a distance as the hand's cupped shape forms an audio shell.

The switch 16 can assume a wide variety of forms appropriate for actuation by a user's thumb. The switch 16 can be mechanical, electro-mechanical, and/or sensor (e.g., a membrane sensor)-based, and in more general terms provides an actuation surface 60 for receiving a user-applied actuation force or action. The switch 16 is mounted to the case 12 such that the actuation surface 60 faces, or is exposed or accessible at, the outer face 32. The actuation surface 60 is optionally recessed relative to the outer face 32 of the case 12 to avoid incidental contact and unintentional activation. In some embodiments, the switch 16 can be configured to format the actuation surface 60 to include or provide tactile features that differentiate the actuation surface 60 from other surfaces of the case 12 (e.g., surface roughening or smoothness, size, etc.) so that a user can readily identify the actuation surface 60 by touch and/or site. The switch 16 can be configured to provide a biased, normally "off" state. A user can actuate the switch 16 by interfacing with the actuation surface 60; upon removal of the actuation force or action, the switch 16 automatically self-returns to an "off" and/or "sleep" state. The switch or sensor 16 may be configured to be positively actuated only upon the contact of a certain percentage of the sensor or certain minimum pressure on a pressure sensor-type switch to avoid unintended activation. Alternatively, the user may choose an "on and off" motion of the thumb contact to assure mute/zero input through the device when not speaking. In yet other embodiments, the device 10 can be configured such that the case 12 (or ring body to which the case 12 is attached) can be rotated to present the actuation surface 60 of the switch 16 "outwardly" for user interaction or one-advancement contact/range that renders the actuation surface 60 as a typical aesthetic ring ornament.

The mobile communication device 10 locates the sound receiving side 50 of the microphone 14 and the actuation surface 60 relative to one another and relative to a shape of the case 12 to naturally or inherently encourage optimal handling by a user during use. For example, relative to the orientation of FIG. 1A in which, relative to a generally circular shape defined by the outer face 32, the actuation surface 60 is located at a 3 o'clock position, the sound receiving side 50 of the microphone 14 is located at a position between 4 o'clock and 6 o'clock, alternatively at about a 5 o'clock position (it being understood that when viewed from an opposite direction, when the actuation surface 60 is at a 9 o'clock position, the sound receiving side 50 is at about a 7 o'clock position). Stated otherwise, relative to a plane perpendicular to the central axis A (e.g., the cross-sectional plane of FIG. 1A), it is possible to identify a first line L1 that intersects the sound receiving side 50, the inner face 30 and the central axis A, as well as a second line L2 that intersects the actuation surface 60, the inner face 30 and the central axis A. As a point of reference, with embodiments in which the switch 16 incorporates a mechanism configured to receive a user-applied pressing force at the actuation surface 60, the so-applied actuation force can be in a direction of the second line L2. The first and second lines L1, L2 intersect at the central axis A and combine to form an angle θ in the range of 5°-120°, alternatively in the range of 25°-110°, alternatively in the range of 60°-90°. Further, the sound receiving side 50 and the actuation surface 60 are circumferentially aligned with one another. For example, the circumferential line C generated by the outer face 32 (or a circumferential line that is co-axial with the circumferential line C of the outer face 32) passes through both the microphone 14 and the switch 16. It is assumed that a left-handed user device would or could have these orientations converted to work in the typical manner. This places the microphone in the 6 to 8 o'clock position, for example. It is also contemplated that two selectable microphones could be included with the device to promote use on either hand or any worn orientation. Such a device could be configured or programmed to automatically change to the loudest detected or received audio input and switch to one microphone in use. In related embodiments, the device can be configured or programmed to employ the two (or more) microphones in an ambient noise canceling operation (e.g., when the user's hand is more vertically oriented while speaking). Moreover, with optional embodiments including two (or more) of the microphones, the microphones can collect audio data in tandem and be combined to create a single, improved sound recording; additionally, the device can be configured or programmed to inform the user of the most ideal hand/microphone for recording.

A unique, beneficial effect of the above-described geometries during operation of the mobile communication device 10 by a user is reflected in FIG. 2. As a point of reference, FIG. 2 illustrates the device 10 as worn on a user's finger. An additional illustration of the device 10 is also included in FIG. 2, shown apart from the user's hand. As shown, the device 10 is worn on an index finger 70 of the user's hand 72. To use the device 10 in performing a communication operation, the user rotates the device about the index finger 70 so that the actuation surface 60 (referenced generally) is aligned with or "faces" the thumb 74 of the hand 72. The device 10 may include other features that causes the device 10 to naturally orient itself to this position, for example, the C-shaped ring embodiments may place the opening toward the adjoining finger making it more comfortable and correctly self-orienting the microphone and the switch; alternatively, the user may locate the actuation surface 60 (sight or tactile) and rotate then rotate the device 10 to the orientation of FIG. 2. Regardless, with the device 10 oriented such that the actuation surface 60 faces the thumb 74, the hand 72 is maneuvered toward the user's mouth (not shown), and the thumb 74 manipulated to interface with the actuation surface 60 in order to activate the device 10. This action (i.e., bringing the thumb 74 into contact with the actuation surface 60 while the device 10 resides on the index finger 70) naturally causes the index finger 70, as well as other fingers 76 on the user's hand 72, to "cup" or flex as shown. With the user's hand 72 placed over the user's mouth, then, the sound receiving side 50 is naturally in close proximity to the user's mouth and the cupped hand 72 serves to block ambient noise from reaching the sound receiving side 50, and keeps the user's audio more private from people in close proximity.

Returning to FIGS. 1A-1C, the electronic components 18 can assume a wide variety of forms appropriate for controlling operation of the mobile communication device 10. For example, the electronic components 18 can include wireless communication components appropriate for sending data in accordance with an accepted wireless protocol (e.g., Bluetooth). Other electronic components 18 can include computer or processor-types chips or circuitry formatted to initiate, end, or alter an operational state of the device 10 in response to information generated by the switch 16. Alternatively, the device 10 can be formatted such that information generated by the switch 16 is simply wirelessly signaled to a separate controller or control system that is programmed to interpret the information and, in response, dictate an operational state of the device. The electronic components 18 or wireless controller can be formatted to interpret different user interfaces with the actuation surface 60 as implicating different operational modes. For example, the electronic components 18 or wireless controller can be formatted or programmed to simply wirelessly deliver information generated by the microphone 14 only when the user is touching or pressing the actuation surface 60 (e.g., the device 10 is only "on" or activated when the user is actively touching the actuation surface 60, and reverts to an "off" state when the interface with the actuation surface 60 is removed), for example with a predetermined amount or level of force. In other embodiments, the device 10 can be formatted or programmed such that a predetermined sequence of interfaces with the actuation surface 60 are required before the device 10 operates in an active mode (in which information from the microphone 14 is wirelessly delivered). For example, a series of two or more touches in succession at the actuation surface 60 are required. In yet other embodiments where the device 10 includes additional user-interface components (e.g., the display screen 24), the device 10 can be formatted or programmed to operate in different modes in response to different user prompts at the actuation surface 60 (e.g., where the actuation surface 60 is constantly actuated or pressed, the device 10 operates to wirelessly deliver information from the microphone 14, and when the actuation surface 60 is tapped or touches multiple times in succession, one of more of the other user-interface components can be activated). This may also occur based on the motion or direction of the action.

The mobile communication device 10 can optionally include additional features or sensors providing information to the on-board or wirelessly connected processor that facilitate desired operation. For example, the device 10 can include one or more sensors (e.g., proximity sensors, contact sensors, etc.), in addition to the switch 16, located along the outer surface and adapted to be actuated when placed in contact with a user's skin (e.g., opposite the switch 16). With several of these exemplary embodiments, the mobile communication device 10 can be formatted or programmed to operate in the active mode only when both the actuation surface 60 is actuated and when the additional senor is in contact with the user's skin; in this way, the user is naturally encouraged to group his or her fingers close together (so that the user's middle finger is tight against the index finger 70 in order to contact the additional sensor), better ensuring a more complete barrier to ambient noise. In another case, the device may activate within a certain proximate distance from a device such as described in U.S. Pat. No. 8,339,248 to Carroll, the entire teachings of which are incorporated herein by reference. In other exemplary embodiments, the additional sensor(s) can be used in combination with additional microphones carried by the case 12. With these constructions, each microphone is placed at a known circumferential location relative to a corresponding one of the sensors; during use, the device is formatted or programmed to "recognize" which sensor is being actuated by the user's thumb, and thus which microphone should be activated for receiving sound. Thus, a user is afforded the ability to "pick" which microphone he or she wishes to speak into and/or collect other audio. In yet other embodiments, two or three or more switches or sensors are carried by the case 12 in relatively close proximity to one another (e.g., three sensors aligned across a width of the case 12). With these optional constructions, the device can be configured or programmed to operate in the active mode only when the sensors are simultaneously contacted or actuated (indicative of a user purposefully intending to use the device to capture audio, and differentiating from a scenario in which a single one of the sensors is unintentionally contacted or actuated). In yet other embodiments, the devices of the present disclosure can include other electronic components such as a camera or similar image capture device and technology.

The circuitry 20 can assume various forms appropriate for electronically connecting the microphone 14, the switch 16 and the electrical components 18. In some embodiments, the circuitry 20 is formed or provided by a flex circuit as is known in the art. In related embodiments, the flex circuit can serve as a portion or all of the case 12 (e.g., the flex circuitry can be arranged and oriented to define one or both of the inner and outer surfaces 30, 32).

The power source 22 can assume a wide variety of forms appropriate for powering various components of the mobile communication device 10. In some embodiments, the power source 22 is a battery, such as a rechargeable battery, and is carried by or within the case 12. In the embodiments, the power source 22 is a formed by layers of a super capacitor or nanopore material that are flexed to a shape of the case 12. The super capacitor material layers can be a graphene-based super capacitor developed by Monash University of Melbourne, Australia and others. A graphene ($Li_4Ti_3O_{12}$) super capacitor is composed of very thin layers that create a compact electrode from an adaptive graphene gel film. To control the spacing between the graphene sheets on a sub-nanometer scale, liquid electrolytes are used. Unlike conventional super capacitors that are generally made of highly porous carbon with unnecessarily large pores and rely on a liquid electrolyte to transport the electrical charge, the liquid electrolyte in the graphene-base super capacitor plays a dual role of conducting electricity and also maintaining the minute space between the graphene sheets. This maximizes the density without compromising the super capacitor's porosity. Regardless of exact form, the power source 22 is optionally rechargeable, for example at a port 80 carried by the case 12.

As mentioned above, the mobile communication device 10 optionally includes additional components, such as the display screen 24. Where provided, the display screen 24 is mounted to the case 12 at a location circumferentially spaced from the sound receiving side 50 and the actuation surface 60, optionally at a location that is ergonomically conducive to desired wearing or user interface. For example, relative to the orientation of FIG. 1A in which the actuation surface 60 is at a 3 o'clock position, the display screen 24 is located at about the 12 o'clock position. FIG. 2 further reflects that with these exemplary locations, when the device 10 is arranged on the user's index finger 70 such that the display screen 24 faces "upwardly" or away from the user's hand (for ease of viewing and comfort in wearing), the actuation surface 60 is naturally located to be "facing" the user's thumb 74. Other locations and/or connector for image producing devices are also envisioned. For example, a dual projector system as described in U.S. Pat. No. 8,118,435 to Carroll, the entire teachings of which are incorporated herein by reference. Other optional components that can be included with the mobile communication device 10 include one or more LEDs located so as to be visible from the outer face 32, a vibration unit, etc., each formatted to be activated by the electronic components 18 and capable of prompting an action by the user (e.g., where the mobile communication device 10 is used as part of communication system in which the user can receive incoming telephone calls, the LEDs, vibration unit, etc., can be activated to alert the user that a call has been received). In other embodiments, the mobile communication device 10 can include one or more speakers.

Figure 3A:
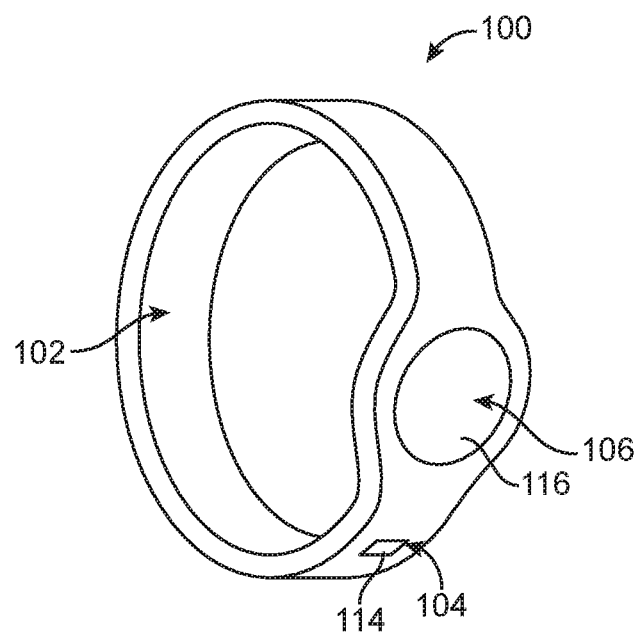
FIG. 3A is a perspective view of another mobile communication device in accordance with principles of the present disclosure.
Figure 3B:
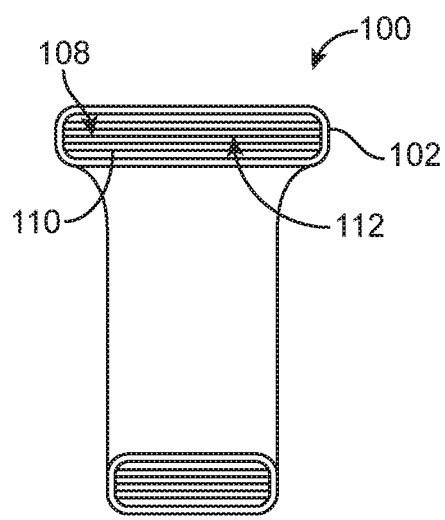
FIG. 3B is a cross-sectional view of the device of FIG. 3A.

Another embodiment mobile communication device 100 in accordance with principles of the present disclosure is shown in FIGS. 3A and 3B. The device 100 is highly akin in many respects to the mobile communication device 10 (FIG. 1A), and can include some or all of the features described above. In more general terms, the device 100 includes a case 102, a microphone 104, a switch 106, electrical components 108 (referenced generally), connective circuitry 110, and a power source 112. The device 100 is highly akin in many respects to the mobile communication device 10 (FIG. 1A), with the case 102, microphone 104, electrical components 108, connective circuitry 110 and power source 112 having any of the forms described above. Further, a sound receiving side 114 of the microphone 104 and an actuation surface 116 of the switch are spatially arranged relative to one another and relative to the case 102 as described above. With the device 100 of FIGS. 3A and 3B, the switch 106 is a finger or thumb print identification sensor. The electrical components 108 (e.g., processor) is programmed to interpret a thumb print received at the switch 106, and will only activate the device 100 if the received thumb print matches a thumb print stored in a database thus providing a security feature. For example, the device 100 can optionally be used as part of system whereby the user performs secured electronic transactions, such as payment of bills over the Cloud or internet. In related embodiments, the secured electronic transaction system can incorporate voice recognition security features enabled by speech received at the microphone 104.

Figure 4A:
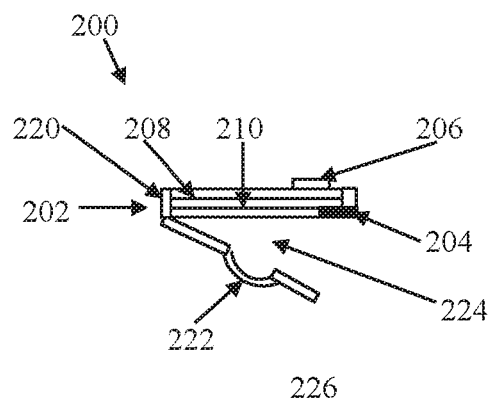
FIG. 4A is a simplified cross-sectional view of another mobile communication device in accordance with principles of the present disclosure.

Another embodiment mobile communication device 200 in accordance with principles of the present disclosure is shown in FIG. 4A. The device 200 is highly akin in many respects to the mobile communication device 10 (FIG. 1A), and can include some or all of the features described above. In more general terms, the device 200 includes a case 202, a microphone 204, a switch 206, electrical components 208 (referenced generally), connective circuitry (not shown), and a power source 210. The device 200 is highly akin in many respects to the mobile communication device 10 (FIG. 1A), with the microphone 204, electrical components 208, connective circuitry and power source 210 (e.g., a coin battery) having any of the forms described above.

The case 202 is generally configured for selective mounting to a separate ring body, and includes a housing 220 and a clip arm 222. The housing 220 maintains various other components of the device 200 (e.g., the microphone 204, the switch 206, the electrical components 208, the connective circuitry, and the power source 210) commensurate with previous descriptions. The clip arm 222 is connected to the housing 220 (e.g., hinged connection), with the housing 220 and the clip arm 222 combining to define a capture zone 224. The clip arm 222 can be pivoted or otherwise manipulated from the open state of FIG. 4A to a closed state in which a free end 226 of the clip arm 222 is attached to the housing 220.

Figure 4B:
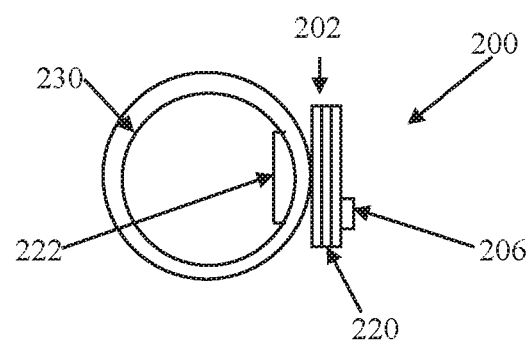
FIG. 4B is a simplified side view of the device of FIG. 4A mounted to a separate ring body.

The device 200 is shown assembled to a separate ring 230 (e.g., a standard jewelry-type ring) in FIG. 4B. The clip arm 222 is assembled about a thickness of the ring 230 and attached to the housing 220, thereby securing the device 200 to the ring 230. The ring 230 can then be worn by a user, and the device 200 operated as described above.

Regardless of exact form, the mobile communication devices of the present disclosure can be used within or as part of a plethora of different systems. For example, the mobile communication device can be wirelessly linked to a controller programmed to perform various functions, such as a fixed computer with wireless interface capabilities or existing smart phone. The user can perform a telephone call operation by speaking into the mobile communication device as described above, with audio intended to be heard by the user being delivered either by another component of the system or by a speaker provide with the mobile communication device (e.g., where the mobile communication device of the present disclosure is electronically linked to a hands-free telephone system of an automobile, audio intended to be heard by the user is delivered via the automobile's speakers).

Another beneficial use of the mobile communication devices of the present disclosure is as part of an automated audio support system, examples of which are described in U.S. Pat. No. 8,339,248. The audio support system is generally configured such that workers or crew members in a working environment (e.g., a restaurant) are each provided with an automated audio support device and a signaling device all commonly linked to a central controller. The controller is programmed to deliver selected messages or other information to particular or identified ones of the workers, and to receive and act upon information received from the signaling devices. The mobile communication devices of the present disclosure can be used as the signal device carried by each worker, allowing each worker to conveniently deliver spoken words to the controller with minimal interference from ambient noise.

The mobile communication devices, and related systems, provide a marked improvement over previous designs. The device is conveniently and comfortably worn on the user's fingers, and is thus readily accessible at all times. The microphone and actuation switch carried by the device are strategically located to encourage the user to naturally cup his or her hand during use. The inside-of-hand microphone blocs ambient noises, supports conversations, and is ideally placed for speech recognition. The orientation of the switch(es) relative to the microphone(s) along a circumference of the ring-like case requires a particular ring orientation during use that positions the microphone(s) to a particular orientation that is not covered by the user's thumb yet close enough to be positioned more ideally for user audio input (e.g., at an angle to the user's mouth and distance from the mouth that is a fairly small window for optimal speech recognition).

Although the present disclosure has been described with reference to preferred embodiments, workers skilled in the art will recognize that changes can be made in form and detail without departing from the spirit and scope of the present disclosure. For example, the "automatic" cupped hand when activated format of the ring devices of the present disclosure also works well at arm's reach when the system is put into "speaker mode". This can be used for the user's input, and works well for a tired arm during long conversations or when driving a car with both hands on the wheel. The shape of the cupped hand in most cases serves as an audio capturing cone/form to assist the microphone at distance. The user needs only to "aim" the cupped hand toward his/her mouth (e.g., while resting the arm on a chair, table, or other surface). Devices of the present disclosure can also assist audio enhancement for remote pick-up of audio from sources other than the user. A user may desire to listen in on another audio source for recording, monitoring, providing hearing impaired assistance, etc. For example, a hearing impaired person can use the device worn with a cupped hand to gather audio from a specific location by "aiming" the cupped hand at the source. The received audio input can be enhanced by a separate system and then delivered back to the user (e.g., via speaker head set, stereo ear canal directed hearing aids or audio tubes with improved listening volume, SW application(s) improved quality such as noise canceling processing techniques, etc.). In related embodiments, the device can be configured or programmed to provide an indication to the user that the cupped hand is optimally aimed at an audio source, such as beeps, flashing lights, vibration, etc. that alert a user when the cupped hand is straying off course (or vice-versa). In yet other embodiments, two of the devices can be worn by a user (e.g., one on each hand) and are configured or programmed to operate in tandem, such as to provide noise canceling inputs, providing improved audio performance at a distance. Distance between the microphone(s) of each of the two devices can be used by appropriate software or other programming to zero in on the subject's voice (or other audio output of interest) and to use software to do noise canceling.

What is claimed is:

1. A method for electronically interfacing with a remote electronic device using a finger worn, ring mobile communication device, the method comprising:
   placing a ring mobile communication device over a first finger of a hand of a user, the ring mobile communication device including a case defining a passage within which the first finger is received, a microphone carried by the case and defining a sound receiving side, and a switch carried by the case, the switch defining an actuation surface and electronically linked to the microphone;
   arranging the case relative to the first finger to locate the actuation surface proximate a second finger of the hand;
   touching the actuation surface with the second finger to initiate an active mode of operation;
   completing initiation of the active mode when the ring mobile communication device is determined to be proximate the remote electronic device;
   collecting audio input at the microphone while in the active mode; and
   wirelessly transmitting the collected audio input to a remote electronic device while in the active mode.

2. The method of claim 1, wherein the step of arranging includes rotating the case about the first finger.

3. The method of claim 2, wherein the step of rotating naturally locates the sound receiving side within, and facing away from, a palm of the hand.

4. The method of claim 1, further comprising positioning the hand proximate a mouth of the user, and further wherein the collected audio input includes at least one word spoken by the user.

5. The method of claim 4, wherein the step of arranging naturally locates the sound receiving side within, and facing away from, a palm of the hand, and further wherein the step of touching naturally causes the hand to cup.

6. The method of claim 5, wherein the step of positioning includes the cupped hand blocking ambient noise from reaching the sound receiving side.

7. The method of claim 5, wherein the step of collecting includes the cupped hand focusing audio delivered from a mouth of the user to the sound receiving side.

8. The method of claim 1, wherein the first finger is an index finger of the hand and the second finger is a thumb of the hand.

9. The method of claim 1, wherein the sound receiving side and the actuation surface are located along an outer face of the case, and further wherein the sound receiving side and the actuation surface are circumferentially aligned with each other and are circumferentially spaced from each other relative to a circumferential line defined by the outer face in a plane perpendicular to a central axis of the passage.

10. The method of claim 1, wherein the step of touching includes the second finger in constant contact with the actuation surface.

11. The method of claim 1, wherein the step of touching includes touching the actuation surface at least two times in succession.

12. The method of claim 1, wherein the step of touching includes the second finger applying a pressing force onto the actuation surface.

13. The method of claim 12, wherein the step of applying a pressing force includes the pressing force being applied in a direction of a line intersecting the actuation surface and a central axis defined by the passage.

14. The method of claim 1, wherein the step of adjusting includes identifying a tactile feature of the actuation surface distinct from a surface of the case.

15. The method of claim 1, wherein the ring mobile communication device is a first ring mobile communication device and the hand is a first hand of the user, the method further comprising:
   placing a second ring mobile communication device over a finger of a second hand of the user, the second ring mobile communication device including a case and a microphone;
   cupping the first and second hands;
   positioning the cupped first hand to aim the microphone of the first ring mobile communication device at an audio source apart from the user;
   positioning the cupped second hand to aim the microphone of the second ring mobile communication device at the audio source; and
   simultaneously collecting audio input from the audio source at the microphone of the first ring mobile communication device and at the microphone of the second ring mobile communication device.

16. A method for electronically interfacing with a remote electronic device using a finger worn, ring mobile communication device, the method comprising:
   placing a ring mobile communication device over a first finger of a hand of a user, the ring mobile communication device including a case defining a passage within which the first finger is received, a microphone carried by the case and defining a sound receiving side, and a switch carried by the case, the switch defining an actuation surface and electronically linked to the microphone;
   arranging the case relative to the first finger to locate the actuation surface proximate a second finger of the hand;
   touching the actuation surface with the second finger to initiate an active mode of operation;
      wherein the step of touching includes the second finger applying a pressing force onto the actuation surface,
      wherein the step of applying a pressing force includes the pressing force being applied in a direction of a line intersecting the actuation surface and a central axis defined by the passage;

collecting audio input at the microphone while in the active mode; and wirelessly transmitting the collected audio input to a remote electronic device while in the active mode.

17. A method for electronically interfacing with a remote electronic device using a finger worn, ring mobile communication device, the method comprising:

placing a first ring mobile communication device over a first finger of a first hand of a user, the first ring mobile communication device including a case defining a passage within which the first finger is received, a microphone carried by the case and defining a sound receiving side, and a switch carried by the case, the switch defining an actuation surface and electronically linked to the microphone;

placing a second ring mobile communication device over a finger of a second hand of the user, the second ring mobile communication device including a case and a microphone;

arranging the case of the first ring mobile communication device relative to the first finger of the first hand to locate the actuation surface proximate a second finger of the first hand;

touching the actuation surface with the second finger to initiate an active mode of operation;

cupping the first and second hands;

positioning the cupped first hand to aim the microphone of the first ring mobile communication device at an audio source apart from the user;

positioning the cupped second hand to aim the microphone of the second ring mobile communication device at the audio source;

simultaneously collecting audio input from the audio source at the microphone of the first ring mobile communication device and at the microphone of the second ring mobile communication device; and wirelessly transmitting the collected audio input to a remote electronic device while in the active mode.

* * * * *